United States Patent [19]
Robson

[11] Patent Number: 5,638,450
[45] Date of Patent: Jun. 10, 1997

[54] METHOD AND APPARATUS FOR ESTABLISHING TWO WAY COMMUNICATIONS BETWEEN A PAGER DEVICE AND A PAGING SERVICE PROVIDER

[75] Inventor: Christopher J. Robson, Bristol, England

[73] Assignee: Hewlett-Packard Company, Palo Alto, Calif.

[21] Appl. No.: 639,046

[22] Filed: Apr. 16, 1996

Related U.S. Application Data

[63] Continuation of Ser. No. 292,374, Aug. 18, 1994, abandoned.

[51] Int. Cl.⁶ .................... H04L 9/00; H04Q 7/08; H04Q 7/10
[52] U.S. Cl. .................... 380/49; 380/9; 380/23; 380/29; 340/311.1; 340/825.44; 379/56; 379/57; 379/58; 379/59; 379/62; 379/63; 455/31.1; 455/33.1; 455/38.1
[58] Field of Search ............... 340/825.44, 311.1, 340/313; 455/33.1, 49.1, 53.1, 54.1, 54.2, 31.1, 38.1; 379/57, 58, 59, 60, 56, 62, 63, 170, 217; 380/9, 20, 21, 49, 23

[56] References Cited

U.S. PATENT DOCUMENTS

| | | | |
|---|---|---|---|
| 3,976,995 | 8/1976 | Sebestyen | 340/825.44 |
| 4,178,476 | 12/1979 | Frost | 379/59 |
| 4,823,123 | 4/1989 | Siwiak | 340/825.44 |
| 4,825,193 | 4/1989 | Siwiak et al. | 340/825.44 X |
| 4,856,047 | 8/1989 | Saunders | 379/57 |
| 4,875,038 | 10/1989 | Siwiak et al. | 340/825.44 |
| 4,882,579 | 11/1989 | Siwiak | 340/825.44 |
| 4,891,637 | 1/1990 | Siwiak et al. | 340/825.44 |
| 5,043,721 | 8/1991 | May | 340/825.44 |
| 5,128,980 | 7/1992 | Choi | 379/56 |
| 5,142,279 | 8/1992 | Jasinski et al. | 340/825.44 |
| 5,280,516 | 1/1994 | Jang | 379/57 |
| 5,283,832 | 2/1994 | Lockhart, Jr. et al. | 380/49 |
| 5,285,496 | 2/1994 | Frank et al. | 380/9 |

FOREIGN PATENT DOCUMENTS

| | | | |
|---|---|---|---|
| 0434231 | 6/1991 | European Pat. Off. | G06F 15/02 |
| 2252015 | 7/1992 | United Kingdom | H04Q 7/00 |
| WO91/01615 | 2/1991 | WIPO | H04Q 7/00 |
| WO94/08421 | 4/1994 | WIPO | H04M 11/00 |

*Primary Examiner*—Bernarr E. Gregory
*Attorney, Agent, or Firm*—Curtis G. Rose

[57] ABSTRACT

A two way communications path is established between a pager device and a paging service provider. The pager device generates a control command for the paging service provider, converts the control command into signals recognizable by a telephone network, and transmits the signals to the paging service provider over the telephone network. The paging service provider receives the signals from the pager device over the telephone network, generates one or more messages for the pager device in response to these signals, and sends the message(s) to the pager device over a wireless paging network. The pager device receives the message(s) over the wireless paging network.

15 Claims, 6 Drawing Sheets

METHOD AND APPARATUS FOR ESTABLISHING TWO WAY COMMUNICATIONS BETWEEN A PAGER DEVICE AND A PAGING SERVICE PROVIDER

CROSS REFERENCE TO RELATED APPLICATION

This is a continuation of copending application Ser. No. 08/292,374 filed on Aug. 18, 1994, now abandoned.

FIELD OF THE INVENTION

This invention relates to the electronics circuitry field. More particularly, this invention is a method and apparatus for establishing two way communications between a pager device and a paging service provider.

BACKGROUND OF THE INVENTION

Back in the old days, the primary way to get a message to someone was to write the message down on a piece of paper, put it in an envelope, seal the envelope so no one could see the message, put the person's address on the envelope, put a stamp on the envelope, and drop the envelope into a big metal box. A few days later, the envelope would be delivered to the person for whom the message was intended. This person would then open up the envelope and read the message contained inside.

The above message delivery approach was called "mail". Mail worked great for hundreds of years, but then people decided that they could no longer wait for a few days to get a message. They wanted it faster. Telephones were great for interactively communicating informal messages quickly, but many messages still needed to be received in a textual form. Express mail cut mail delivery time of messages down to one day in most cases, but this wasn't fast enough either. Facsimile machines and electronic mail cut delivery time of messages down to minutes, but, alas, people still found this to be insufficient. They wanted it faster.

The problem is that while e-mail and facsimile machines can indeed deliver a message in minutes, the speed of e-mail and fax machines does precious little good if the person for whom the message is intended is not there to receive it. Increasingly, in today's mobile society, this is precisely the case. A fax or e-mail containing an important message is sent in a manner of minutes to its intended recipient—where it waits for hours, days or even weeks until they get back to read it.

In the midst of this desire to communicate quickly with increasingly mobile people, the pager has emerged as a way to get messages to people within seconds—even if they are away from their office. Today's pager devices often contain a multi-line display capable of displaying lengthy messages. An example of such a prior art pager device is shown in commonly assigned U.S. Pat. 5,043,721 to May. A paging service provider, such as HP StarLink, sends a message to such a device by broadcasting the message, along with an identifier of the device, over a wireless paging network in a predetermined geographical area. The pager device, if in range of this wireless paging network, will recognize that it is the intended recipient of this message and display or otherwise process this message.

While a pager device allows for the quick delivery of a message to a mobile recipient, it fails to match the reliability and security of mail and other less speedy message delivery systems. Since the wireless paging network transmits messages through the air over radio frequencies, they are capable of being intercepted by anyone who has a receiver tuned to the frequency of the transmitter. In addition, if the intended recipient travels with his or her pager device out of the predetermined geographical area of the paging service, an important message can quite literally be lost in space and never received by its intended recipient.

SUMMARY OF THE INVENTION

A two way communications path is established between a pager device and a paging service provider. The pager device generates a control command for the paging service provider, converts the control command into signals recognizable by a telephone network, and transmits the signals to the paging service provider over the telephone network. The paging service provider receives the signals from the pager device over the telephone network, generates one or more messages for the pager device in response to these signals, and sends the message(s) to the pager device over a wireless paging network. The pager device receives the message(s) over the wireless paging network.

DETAILED DESCRIPTION OF THE PREFERRED EMBODIMENT

Figure 1:
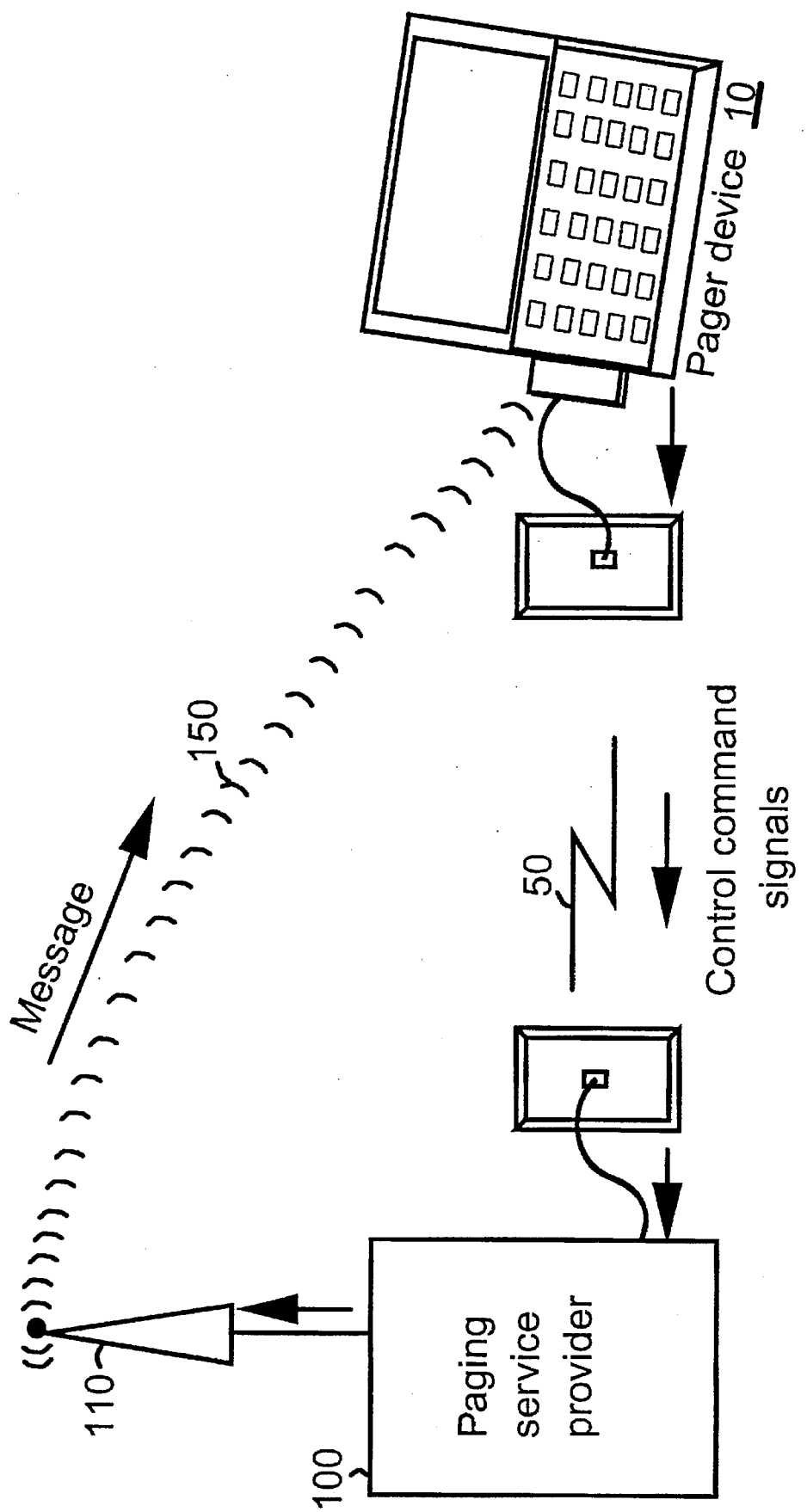
FIG. 1 shows the two way communications path between the pager device and paging service provider of the preferred embodiment of the invention.

FIG. 1 shows the two way communications path between the pager device and paging service provider of the preferred embodiment of the invention. Pager device 10 generates a control command for paging service provider 100. A "control command" is defined as any command that alters the behaviour of paging service provider 100. Pager device 10 converts this control command into signals recognizable by telephone network 50, and transmits these signals to paging service provider 100 over telephone network 50. Paging service provider 100 receives the signals from pager device 10 over telephone network 50. Paging service provider 100 then generates one or more messages for pager device 10 in response to these signals, and sends the message(s) to pager device 10 over wireless paging network 150 via transmitter 110. Pager device 10 receives the message(s) over wireless paging network 150.

An example will help to further illustrate the high level operation of the preferred embodiment of the invention. Let's say that Frank normally receives messages in a geographical area that covers the Willamette valley of Oregon. He then gets on an airplane and flies from Oregon to Hawaii to attend an important meeting. When Frank arrives in Hawaii, he plugs his pager device into a phone jack in his hotel room. Under his direction, his pager device sends control command signals to the paging service provider asking that it change his geographical area of coverage from Oregon to Hawaii, and that it resend today's messages to him in Hawaii. But Frank is concerned that his important messages might be intercepted when he is in Hawaii, so he sends another control command asking that future messages be encrypted with a new private encryption key his computer has just generated. During the trip to Hawaii, Frank had the good fortune to be sitting next to a famous financial analyst who peppered Frank with great stock tips. One of his tips was that Marriott stock would be a "true steal" if is it's price fell below $25/share. So Frank sent yet another control command asking that he be sent an urgent message if the price of Marriott stock fell below $25/share. The paging service provider alters its behaviour in response to each of Frank's control commands by sending future messages to Hawaii, encrypting them, and watching the price of Marriott stock. The paging service preferably also alters its behaviour by sending messages back to the paging device acknowledging receipt of each of the control command signals.

Figure 2:
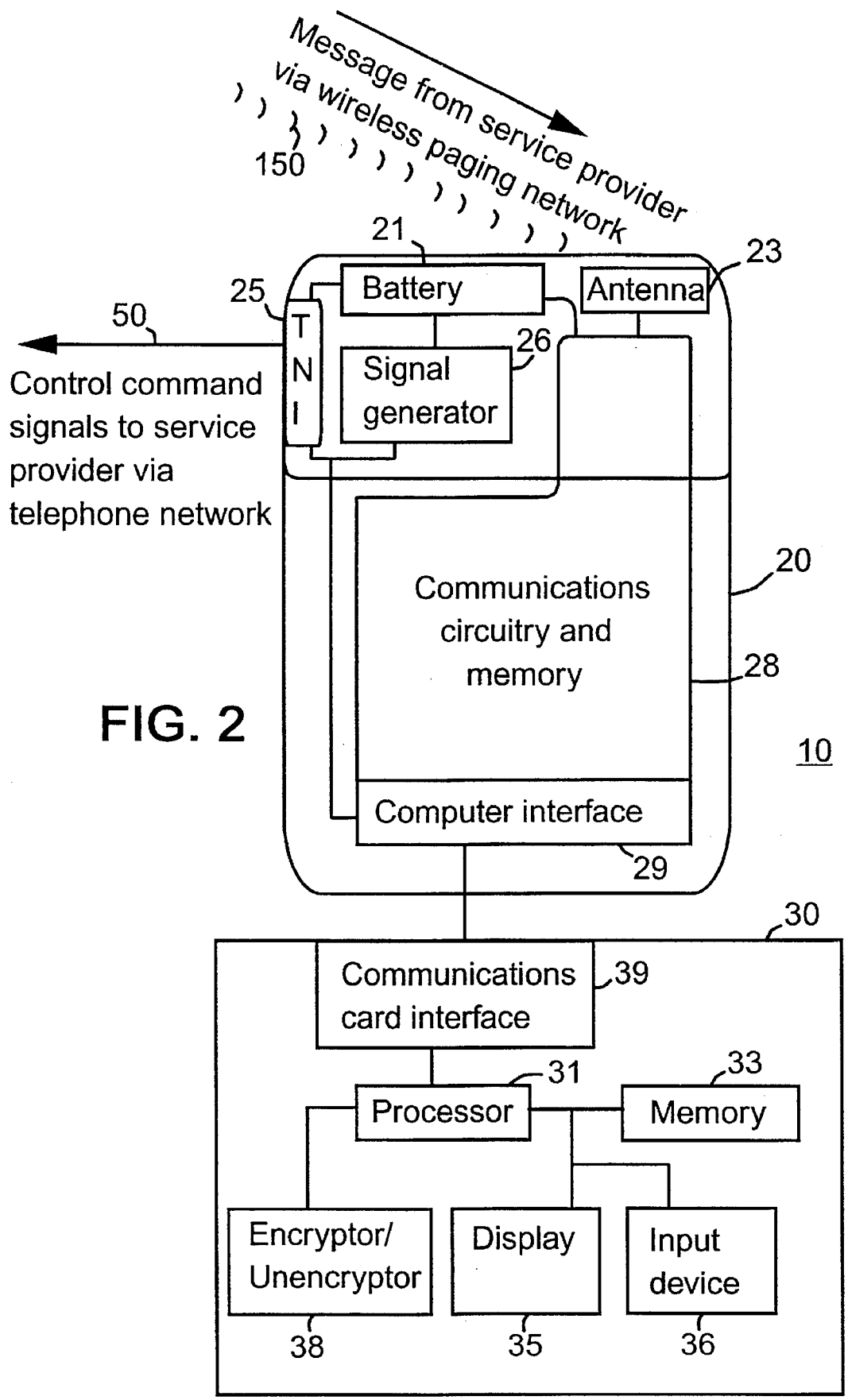
FIG. 2 shows the pager device of the preferred embodiment of the invention in more detail.

FIG. 2 shows the pager device of the preferred embodiment of the invention in more detail. Pager device 10 contains communications card 20 and computer 30. Communications card 20 contains battery 21, antenna 23, telephone network interface 25, signal generator 26, communications circuitry and memory 28, and computer interface 29. In the preferred embodiment, communications card 20 is an F1028A HP Wireless PCMCIA Receiver Card manufactured by the Motorola Corporation, with the addition of telephone network interface 25 and signal generator 26. In the preferred embodiment, signal generator 26 generates dual tone multi frequency (DTMF) tones, although other tones could also be used. DTMF tones are well known as the tones generated when a key on a touch tone telephone keypad is pressed. The circuitry contained in signal generator 26 is conventional and can be found in most telephones and modems today. In the preferred embodiment, telephone network interface 25 is a conventional R J-11 phone jack capable of direct connection via a telephone line to telephone network 50. Telephone network interface 25 also contains conventional on-hook/off-hook circuitry such as that found in most telephones and modems today.

An alternate embodiment has been contemplated where telephone network interface 25 is a speaker capable of playing tones generated by signal generator 26 into the receiver of a telephone connected with paging service provider 100 via telephone network 50. In this embodiment, telephone network interface 25 is aurally and not directly coupled to telephone network 50.

Computer 30 contains processor 31, memory 33, display 35, input device 36, encryptor/unencryptor 38, and communications card interface 39. In the preferred embodiment, computer 30 is an Hewlett-Packard 200LX palmtop computer. Processor 31 is suitably programmed to practice the disclosed invention. Encryptor/unencryptor 38 uses conventional software-controlled encryption technology, such as the key-based DES encryption algorithm, to perform its function.

An alternate embodiment has been contemplated where communications card 20 and computer 30 are integrated into a single handheld pager device similar in size to conventional pagers.

Those skilled in the art will appreciate that pager device 10 does not contain a modem or any other mechanism capable of establishing a two way communication path between pager device 10 and paging service provider 100 solely over telephone network 50. As will be described in more detail later, the capabilities of pager 10 with respect to telephone network 50 are limited to taking a telephone line off hook, generating some signals recognizable by telephone network pressure sensor 50 (e.g. DTMF tones), and putting the telephone line back on hook. While a modem could be used to perform the services of telephone network interface 25 and signal generator 26, this is not preferred due to the increased cost.

Figure 3A:
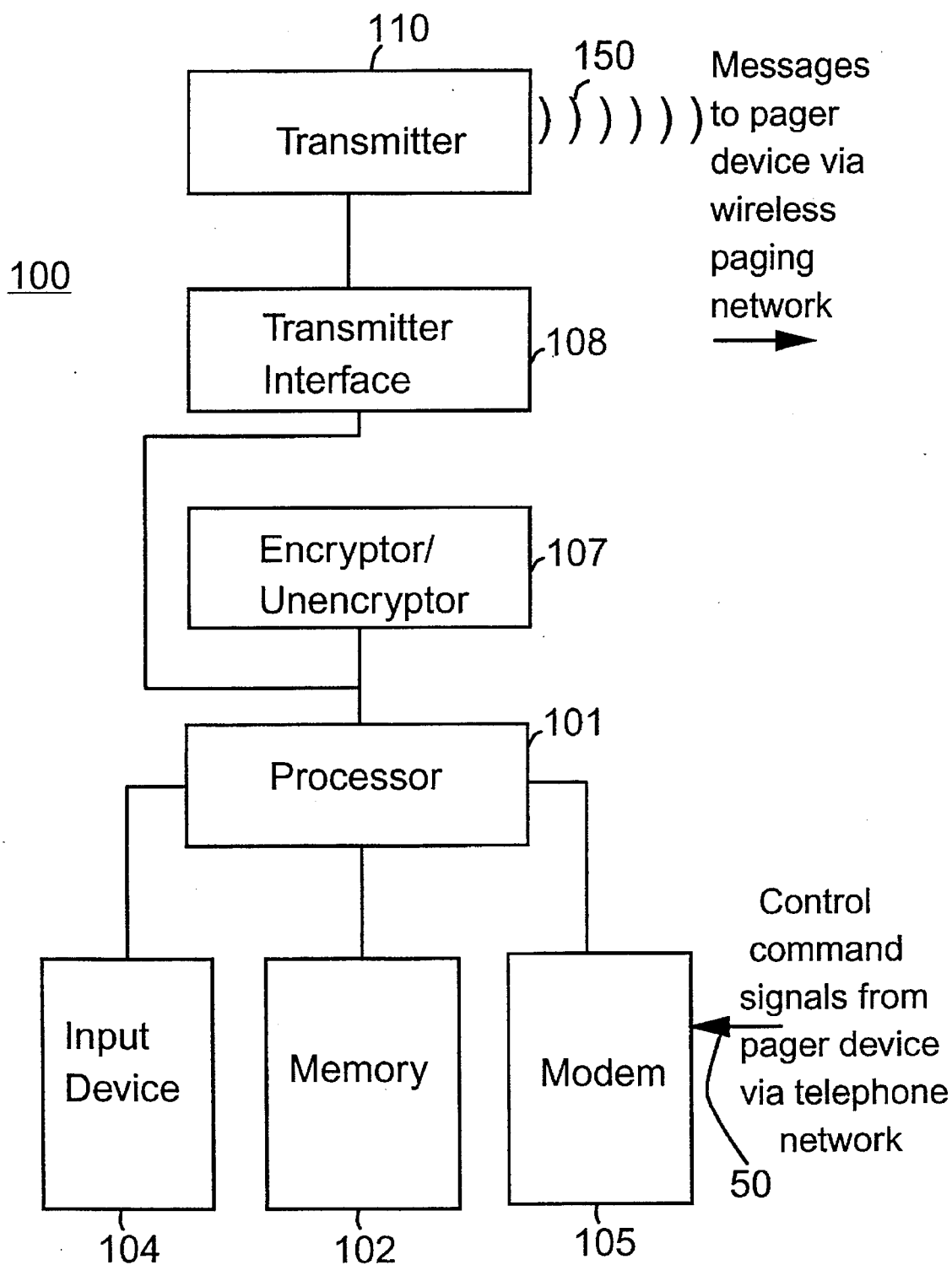
FIG. 3A shows the paging service provider of the preferred embodiment of the invention in more detail.

FIG. 3A shows the paging service provider of the preferred embodiment of the invention in more detail. Paging service provider 100 contains processor 101, memory 102, input device 104, modem 105, encryptor/unencryptor 107, transmitter interface 108, and transmitter 110. Like Encryptor/unencryptor 38, encryptor/unencryptor 107 uses conventional software-controlled encryption technology, such as the key-based DES encryption algorithm, to perform its function. Processor 101 is suitably programmed to practice the disclosed invention.

In the preferred embodiment, paging service provider 100 is the HP StarLink service operated by the National Dispatch Center with the additional capability of receiving control command signals from paging devices over telephone network 50. Paging service provider 100 could also be another commercial service providers such as SkyTel, etc. or a private service provider, and still fall within the spirit and scope of the invention.

An alternate embodiment has been contemplated where modem 105 is replaced by more limited circuitry that simply answers the phone and decodes DTMF tones into digital signals.

Figure 3B:
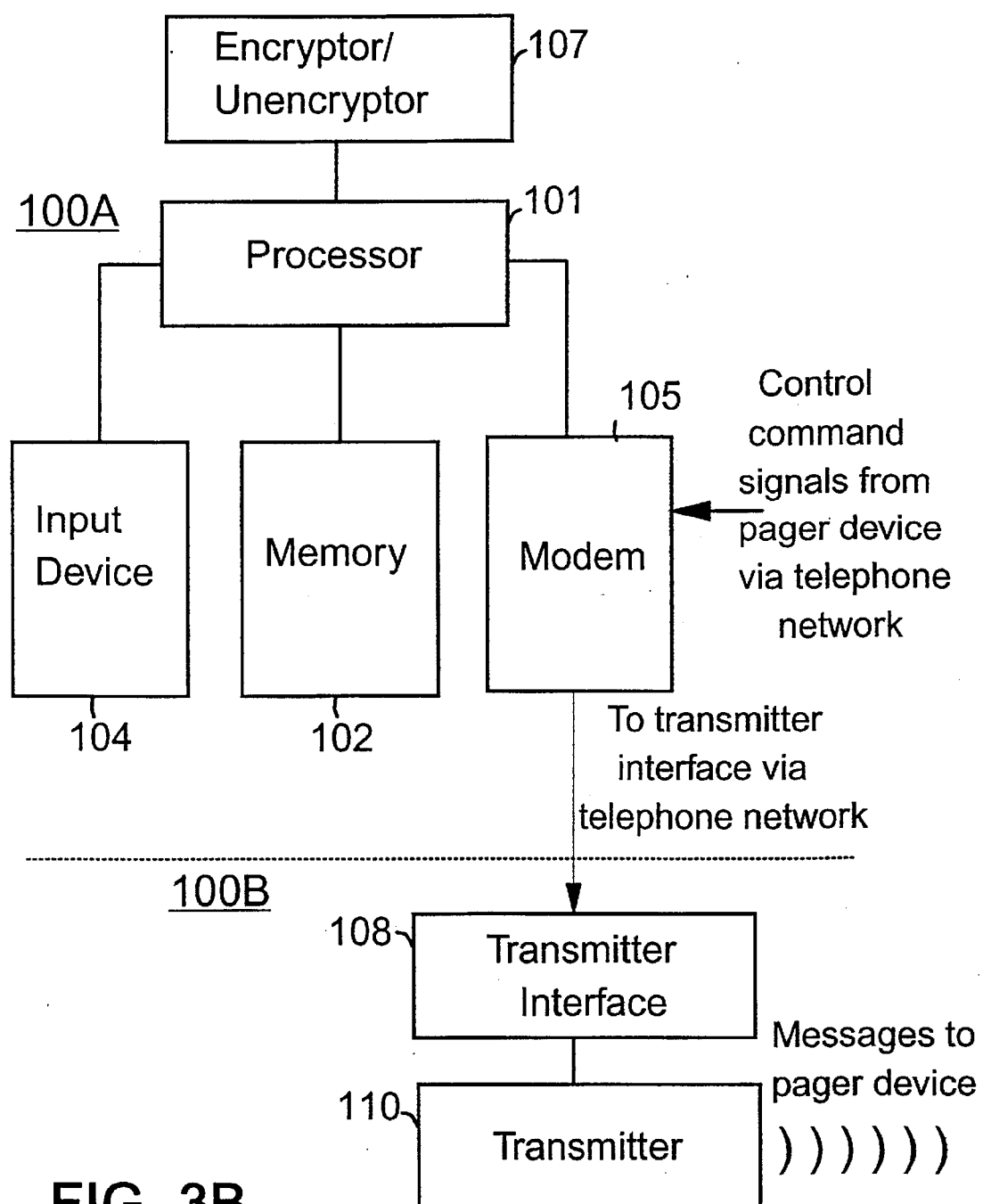
FIG. 3B shows the paging service provider of an alternate embodiment of the invention in more detail.

FIG. 3B shows the paging service provider of an alternate embodiment of the invention in more detail. Unlike the paging service provider shown in FIG. 3A, transmitter interface 105 is not directly connected to processor 101, but instead is accessed by processor 101 via modem 105 over the telephone network. In this embodiment, paging service provider 100 is segmented into a computing portion 100a and a transmitting portion 100b. Computing portion 100a is typically a desktop personal computer, such as a Vectra 486 personal computer manufactured by the Hewlett-Packard Company. Processor 101 is suitably programmed to practice the disclosed invention. Computing portion 100a is often located in the office of the user of pager device 10. Transmitting portion 100b can be located at a commercial or private service provider, as discussed above.

Figure 4:
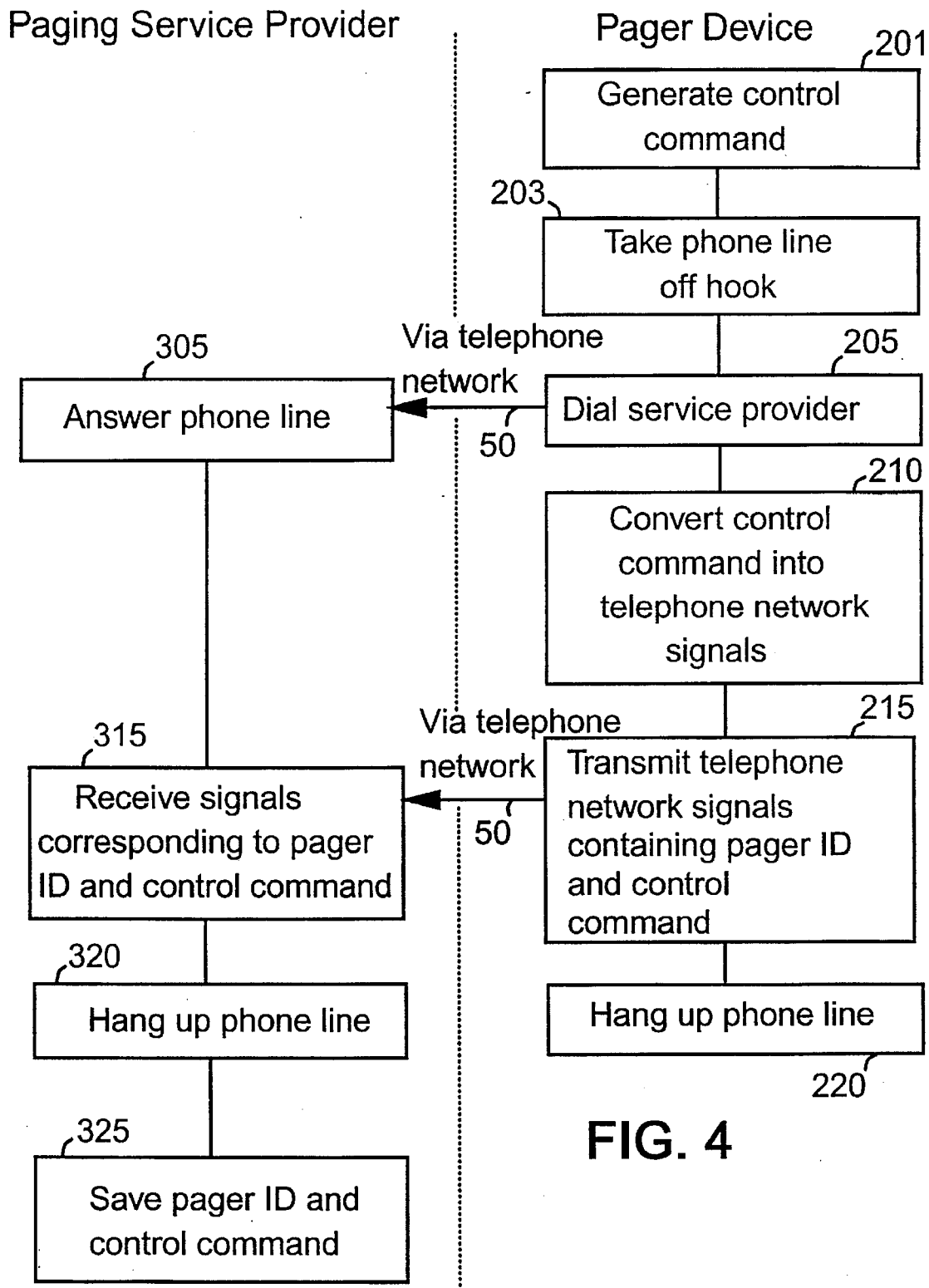
FIG. 4 shows how the pager device communicates with the paging service provider in the preferred embodiment of the invention.

FIG. 4 shows how the pager device communicates with the paging service provider in the preferred embodiment of the invention. Blocks 2xx are executed by processor 31 in pager device 10. Blocks 3xx are executed by processor 101 in paging service provider 100.

A control command is generated in block 201 by pager device 10. As mentioned above, a "control command" is defined as any command that alters the behaviour of paging service provider 100. Block 203 instructs telephone network interface 25 (FIG. 2) to take the phone line off hook (i.e., to get a dial tone on telephone network 50). Block 205 then dials the service provider by using signal generator 26 to generate DTMF tones corresponding to the phone number of paging service provider 100. Paging service provider 100 (FIGS. 3A or 3B) answers the phone in block 305.

Block 210 converts the control command into signals recognizable by telephone network 50 (e.g. DTMF tones) and understandable by paging service provider 100. For example, the command to change geographical service areas from Oregon to Hawaii might translate into a code of "0250", where "02" signifies a request to change service area and "50" signifies the geographical area of Hawaii.

Block 215 transmits these signals, along with signals corresponding to the ID of pager device 10, to paging service provider 100 over telephone network 50. These signals are received by paging service provider 100 in block 315. Pager device 10 hangs up the phone line by instructing telephone network interface 25 to go "on hook" in block 220. Paging service provider 100 performs a similar operation in block 320 by instructing modem 105 (FIG. 3) to go "on hook". Block 325 decodes the signals into binary representations of the pager ID and control command, and stores this information in memory 33.

Figure 5:
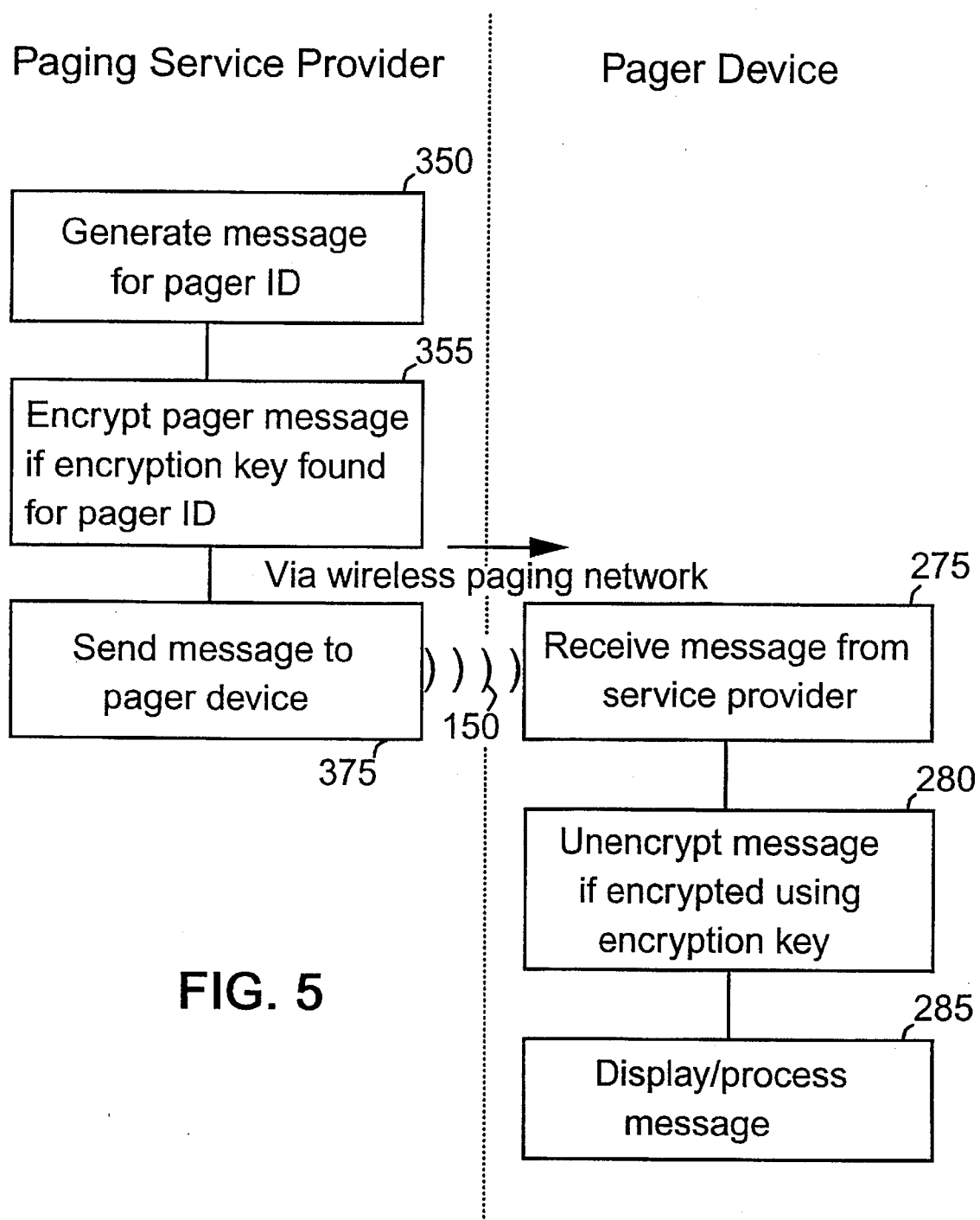
FIG. 5 shows how the paging service provider communicates with the pager device in the preferred embodiment of the invention.

FIG. 5 shows how the paging service provider communicates with the pager device in the preferred embodiment of the invention. As in FIG. 4, blocks 2xx are executed by processor 31 in pager device 10, and blocks 3xx are executed by processor 101 in paging service provider 100. Paging service provider 100 generates one or more messages for pager device 10 in response to the control command signals received in block 315 (FIG. 4). As previously discussed, the message(s) could be a simple acknowledgment of receipt of the control command signals, or it could be some other indication that the behaviour of paging service provider 100 has been altered in response to the control command signals, such as the generation of the next (and future) messages for transmission to Hawaii instead of to Oregon.

If a private encryption key for the pager ID is found in memory 102, the message generated in block 350 is encrypted using this private encryption key. In the preferred embodiment, pager device 10 can send a private encryption key as pad of control command signals to encrypt future messages, as has been discussed.

Block 375 sends the message (either encrypted or normal) to pager device 10 over wireless paging network 150. Pager device 10 receives the message in block 275. If the message is encrypted, pager device 10 unencrypts the message using the private encryption key provided earlier to paging service provider 100 in block 280. Block 285 then displays and/or otherwise processes the message. For example, if the message is a notification of an upcoming meeting, it could be stored directly in the user's electronic calendar with or without display to the user. Certain types of messages (e.g. that Marriott stock just fell below $25/share) could be accompanied by unique display and/or sound attributes to distinguish this message from other types of messages.

What is claimed is:

1. A method of establishing two way communications between a pager device and a paging service provider, said method comprising the steps of:

in said pager device,
generating control command signals for said paging service provider, wherein said control command signals are any signals that alter the behaviour of said paging service provider by causing said paging service provider to generate and send a message to said pager device in response to said control command signals;
transmitting said control command signals to said paging service provider over said telephone network;

in said paging service provider,
receiving said control command signals from said pager device over said telephone network;
generating said message for said pager device in response to said control command signals received from said pager device over said telephone network;
sending said message to said pager device over a wireless paging network; and in said pager device,
receiving said message from said paging service provider over said wireless paging network.

2. The method of claim 1, wherein said control command signals generated by said pager device is an encryption key, said method further comprising the steps of:

in said paging service provider,
encrypting said message generated in said generating a message step using said encryption key prior to sending said message to said pager device in said sending step; and in said pager device,
unencrypting said message received from said paging service provider using said encryption key.

3. The method of claim 2, further comprising the steps of:
in said pager device,
taking a phone line connected to said telephone network off hook; and
dialing a phone number associated with said paging service provider.

4. The method of claim 2, wherein said control command signals are a series of DTMF tones, said transmitting step further comprises the step of:
playing said series of DTMF tones through a speaker into a telephone receiver connected to a telephone network connected with said paging service provider.

5. The method of claim 2, further comprising the step of:
displaying said message unencrypted by said unencrypting step.

6. The method of claim 1, further comprising the steps of:
in said pager device,
taking a phone line connected to said telephone network off hook; and
dialing a phone number associated with said paging service provider.

7. The method of claim 1, wherein said control command signals are a series of DTMF tones, said transmitting step further comprises the step of:
playing said series of DTMF tones through a speaker into a telephone receiver connected to a telephone network connected with said paging service provider.

8. The method of claim 1, further comprising the step of:
in said pager device,
displaying said message received from said paging service provider in said receiving step on a display.

9. The method of claim 1, further comprising the steps of:
in said service provider,
generating a plurality of messages for said pager device in response to said control command signals received from said pager device over said telephone network;
sending said plurality of messages to said pager device over a wireless paging network; and
in said pager device,
receiving said plurality of messages from said paging service provider over said wireless paging network.

10. A pager device, comprising:
means for generating control command signals for a paging service provider, wherein said control command signals are any signals that alter the behaviour of said paging service provider by causing said paging service provider to generate and send a message to said pager device in response to said control command signals;

said control command signals being recognizable by a telephone network;

means for transmitting said control command signals to said paging service provider over said telephone network; and means for receiving said message from said paging service provider over a wireless paging network, said message sent in response to said control command signals sent to said paging service provider over said telephone network.

11. The pager device of claim 10, wherein said control command signals generated by said pager device is an encryption key.

12. The pager device of claim 11, further comprising:

means for unencrypting said message received from said paging service provider using said encryption key.

13. A paging service provider for communicating with a pager device, comprising:

means for receiving control command signals from said pager device over said telephone network, wherein said control command signals are any signals that alter the behaviour of said paging service provider by causing said paging service provider to generate and send a message to said pager device in response to said control command signals;

means for generating said message for said pager device in response to said control command signals received from said pager device over said telephone network; and means for sending said message to said pager device over a wireless paging network.

14. The paging service provider of claim 13, wherein said control command signals generated by said pager device is an encryption key.

15. The paging service provider of claim 14, further comprising:

means for encrypting said message generated by said generating means using said encryption key prior to sending said message to said pager device with said sending means.

* * * * *